(12) United States Patent
Sato et al.

(10) Patent No.: US 10,466,098 B2
(45) Date of Patent: Nov. 5, 2019

(54) INFRARED-TRANSMITTING GLASS

(71) Applicant: NIPPON ELECTRIC GLASS CO., LTD., Otsu-shi, Shiga (JP)

(72) Inventors: Fumio Sato, Otsu (JP); Yoshimasa Matsushita, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/319,403

(22) PCT Filed: Aug. 4, 2015

(86) PCT No.: PCT/JP2015/072091
§ 371 (c)(1),
(2) Date: Dec. 16, 2016

(87) PCT Pub. No.: WO2016/024498
PCT Pub. Date: Feb. 18, 2016

(65) Prior Publication Data
US 2017/0153141 A1    Jun. 1, 2017

(30) Foreign Application Priority Data

Aug. 11, 2014  (JP) ................................. 2014-163436
Jul. 16, 2015  (JP) ................................. 2015-141799

(51) Int. Cl.
*G01J 1/04*    (2006.01)
*C03C 4/10*    (2006.01)
(Continued)

(52) U.S. Cl.
CPC ............... *G01J 1/04* (2013.01); *C03C 3/122* (2013.01); *C03C 4/10* (2013.01); *G01J 5/046* (2013.01); *C03C 2204/00* (2013.01)

(58) Field of Classification Search
CPC ........... G01J 1/04; C03C 4/10; C03C 2204/00
See application file for complete search history.

(56) References Cited

U.S. PATENT DOCUMENTS 3,723,141 A    3/1973  Dumbaugh, Jr.
4,652,536 A    3/1987  Nakajima et al.
(Continued)

FOREIGN PATENT DOCUMENTS

CN    1968904 A        5/2007
DE    3125299 A1 *     5/1982    ............... C03C 3/16
(Continued)

OTHER PUBLICATIONS

Zhou et al. "Development of tellurium oxide and lead-bismuth oxide glasses for mid-wave infra-red transmission optics" Mar. 18, 2013, Proc. of SPIE vol. 8626, 86261F, 28 pages, doi: 10.1117/12.2000315.*

(Continued)

*Primary Examiner* — Marcus H Taningco
(74) *Attorney, Agent, or Firm* — Keating and Bennett, LLP

(57) ABSTRACT

Provided is a novel infrared-transmitting glass that can be vitrified without containing any environmentally harmful compound and has high light transmissivity from visible range to a mid-infrared range of wavelengths of about 4 to about 8 μm. An infrared-transmitting glass containing, in % by mole, 50% or more $TeO_2$, 0 to 45% (exclusive of 0%) ZnO, and 0 to 50% (exclusive of 0% and 50%) RO (where R is at least one selected from the group consisting of Ca, Sr, and Ba).

4 Claims, 1 Drawing Sheet

(51) Int. Cl.
*C03C 3/12* (2006.01)
*G01J 5/04* (2006.01)

(56) References Cited

U.S. PATENT DOCUMENTS

| | | |
|---|---|---|
| 6,626,835 B1 | 9/2003 | Kraus |
| 2007/0105702 A1 | 5/2007 | Matsumoto et al. |
| 2015/0203397 A1* | 7/2015 | Mikami ............ C03C 3/21 501/46 |
| 2016/0221863 A1* | 8/2016 | Murata ............ H04M 1/0202 |

FOREIGN PATENT DOCUMENTS

| | | |
|---|---|---|
| FR | 2 479 179 A1 | 10/1981 |
| JP | 51-28106 A | 3/1976 |
| JP | 62-003042 A | 1/1987 |
| JP | 08-188445 A | 7/1996 |
| JP | 2001-116621 A | 4/2001 |
| WO | WO-2006001346 A1 * | 1/2006 ............ C03C 3/15 |

OTHER PUBLICATIONS

Official Communication issued in International Patent Application No. PCT/JP2015/072091, dated Nov. 10, 2015.

Manikandan et al."Thermal and optical properties of TeO2—ZnO—BaO glasses", Journal of Non-Crystalline Solids, vol. 358, Issue 5, ISSN:0022-3093, DOI:10.1016/jjnoncrysol.2012.01.003, Feb. 2, 2012, pp. 947-951.

Imaoka et al., "3 Seibun-kei Glass-ka Han ' i-5-b-Zoku Genso o Fukumu Tellurite-kei", Report of the Institute of Industrial Science, the University of Tokyo, vol. 26, No. 1, ISSN:0040-9006, Jul. 21, 1976, 47 pages.

Borrelli et al. "Electric-field-induced birefringence properties of high-refractive-index glasses exhibiting large Kerr nonlinearities", Journal of Applied Physics, vol. 70, Issue 5, ISSN:0021-8979, Sep. 1, 1991, pp. 2774-2779.

* cited by examiner

INFRARED-TRANSMITTING GLASS

TECHNICAL FIELD

The present invention relates to glasses suitable as cover members of infrared sensors, including a $CO_2$ sensor and a human sensor, and so on.

Background Art

Mid-infrared light with wavelengths of about 4 to 8 μm is used for infrared sensors, including a $CO_2$ sensor and a human sensor. Glasses having high transmissivity in mid-infrared range are used as cover members of the infrared sensors. Specifically, examples of the glasses include fluoride glasses and chalcogenide glasses.

However, fluoride glasses and chalcogenide glasses generate toxic gases in their melting process, which necessitates the provision of toxic gas treatment equipment or the like and therefore tends to increase the production cost. Furthermore, volatilization of glass components in the melting process is likely to cause a composition deviation. There is also a problem of low weather resistance. Note that because chalcogenide glasses have low light transmissivity in visible range, they may not be able to be used in applications requiring light transmissivity in visible range, for example, from a design viewpoint.

Aluminate glasses are known as oxide glasses having excellent light transmissivity in visible range, but aluminate glasses have very low light transmissivity in an infrared range of wavelengths of 5 μm or more. As oxide glasses having good light transmissivity even with wavelengths of 5 μm or more, there are $Bi_2O_3$—PbO—BaO—ZnO-based glasses described in Patent Literature 1 and $Bi_2O_3$—PbO—ZnO—$CdF_2$-based glasses described in Patent Literature 2.

CITATION LIST

Patent Literature

[PTL 1]
U.S. Pat. No. 3,723,141
[PTL2]
JP-A-H08-188445

SUMMARY OF INVENTION

Technical Problem

The glasses described in Patent Literatures 1 and 2 contain environmentally harmful PbO or $CdF_2$ in large amounts in order to make vitrification stable. Recently, the growing need for reduction in environmental load is making it difficult to use these glasses.

In view of the foregoing, the present invention is aimed at providing a novel infrared-transmitting glass that can be vitrified without containing any environmentally harmful compound and has high light transmissivity from visible range to a mid-infrared range of wavelengths of about 4 to about 8 μm.

Solution to Problem

An infrared-transmitting glass according to the present invention contains, in % by mole, 50% or more $TeO_2$, 0 to 45% (exclusive of 0%) ZnO, and 0 to 50% (exclusive of 0% and 50%) RO (where R is at least one selected from the group consisting of Ca, Sr, and Ba). So long as the infrared-transmitting glass is within the above composition range, it can be obtained as a glass having high light transmissivity from visible range to mid-infrared range, though it does not contain any harmful compound, such as PbO, $CdF_2$ or $Cs_2O$, which is useful for stabilizing vitrification.

The infrared-transmitting glass according to the present invention is preferably substantially free of Ce, Pr, Nd, Sm, Eu, Tb, Ho, Er, Tm, Dy, Cr, Mn, Fe, Co, Cu, V, Mo, and Bi. These elements are components that significantly absorb light in a visible range of wavelengths of about 400 to about 800 nm. Therefore, since the infrared-transmitting glass is substantially free of these elements, a glass having high light transmissivity over a wide visible range can be easily obtained. Note that "substantially free of" herein means that the glass does not purposefully contain the relevant component as a raw material, and is not intended to exclude unavoidable incorporation of impurities. More specifically, this means that the content of the component in the glass composition is less than 0.1% in terms of % by mole of oxide.

In the infrared-transmitting glass according to the present invention, a content of each of $SiO_2$, $B_2O_3$, $P_2O_5$, $GeO_2$, and $Al_2O_3$ is preferably less than 1%. $SiO_2$, $B_2O_3$, $P_2O_5$, $GeO_2$, and $Al_2O_3$ are components that decrease light transmissivity in infrared range. Therefore, by limiting the contents of these components as described above, a glass having excellent light transmittance in infrared range can be easily obtained.

The infrared-transmitting glass according to the present invention is preferably substantially free of Pb, Cs, and Cd. Thus, the recent environmental requirement can be satisfied.

A cover member for an infrared sensor according to the present invention is made of the above-described infrared-transmitting glass.

An infrared sensor according to the present invention includes the above-described cover member for an infrared sensor.

Advantageous Effects of Invention

The present invention enables provision of a novel infrared-transmitting glass that can be vitrified without containing any environmentally harmful compound and has high light transmissivity from visible range to a mid-infrared range of wavelengths of about 4 to about 8 μm.

Furthermore, the infrared-transmitting glass according to the present invention has a low glass transition point and, therefore, has excellent press moldability. Moreover, the infrared-transmitting glass has a high refractive index and, therefore, can be thinned when processed into lenses.

DESCRIPTION OF EMBODIMENTS

Figure 1:
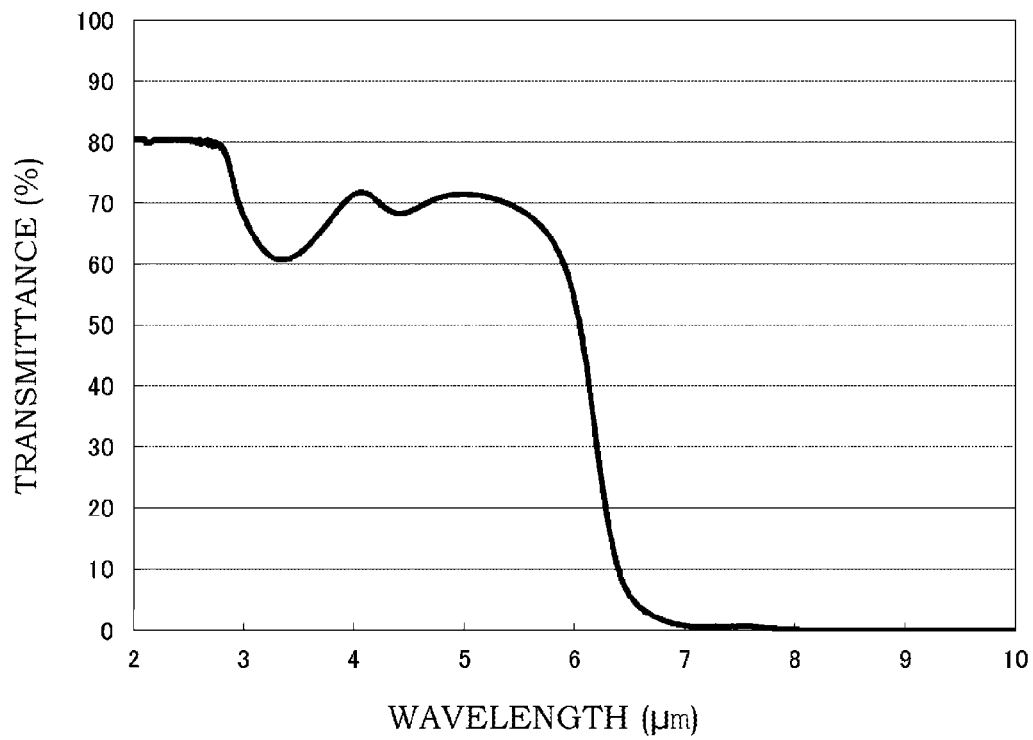
FIG. 1 is a graph representing a mid-infrared range light transmittance curve of a glass of sample No. 1 which is an example.

An infrared-transmitting glass according to the present invention contains, in % by mole, 50% or more $TeO_2$, 0 to 45% (exclusive of 0%) ZnO, and 0 to 50% (exclusive of 0% and 50%) RO (where R is at least one selected from the group consisting of Ca, Sr, and Ba). The reasons why the composition range of the glass is limited as just described will be described below. Note that in the following description of the contents of components, "%" refers to "% by mole" unless otherwise specified.

$TeO_2$ is a component for forming the glass network. Furthermore, $TeO_2$ has the effect of decreasing the glass transition point and increasing the refractive index. The $TeO_2$ content is 50% or more, preferably 66% or more, more preferably 68% or more, and still more preferably 69% or more. If the $TeO_2$ content is too small, this makes vitrification less likely. On the other hand, the upper limit on the $TeO_2$ content is not particularly limited, but the $TeO_2$ content is preferably not more than 99% in consideration of the contents of the other components. When, particularly, the light transmittance in visible range is desired to be increased, the $TeO_2$ content is more preferably not more than 90% and still more preferably not more than 81%.

ZnO is a component for increasing the thermal stability. The ZnO content is 0 to 45% (exclusive of 0%), preferably 10 to 40%, more preferably 11 to 39%, still more preferably 15 to 35%, and particularly preferably 20 to 30%. If ZnO is not contained or the ZnO content is too large, this makes vitrification less likely.

RO (where R is at least one selected from the group consisting of Ca, Sr, and Ba) is a component for decreasing the liquidus temperature to increase the stability of vitrification, without, decreasing infrared transmission characteristics. The RO content is 0 to 50% (exclusive of 0% and 50%), preferably 1 to 25%, more preferably 2 to 20%, still more preferably 2 to 15%, particularly preferably 2 to 14%, and most preferably 3 to 10%. If the RO content is too large, this makes vitrification less likely.

The preferred content ranges of the individual RO components are as follows. The CaO content is 0 to 50% (exclusive of 50%), preferably 0 to 25%, more preferably 1 to 13%, and still more preferably 2 to 10%. The SrO content is 0 to 50% (exclusive of 50%), preferably 0 to 25%, and more preferably 1 to 15%. The BaO content is 0 to 50% (exclusive of 50%), preferably 0 to 25%, more preferably 1 to 20%, still more preferably 2 to 15%, even more preferably 2 to 14%, particularly preferably 2 to 10%, and most preferably 2 to 5%. Among the RO components, BaO has the highest effect of increasing the stability of vitrification. Therefore, positive incorporation of BaO as RO facilitates vitrification.

The infrared-transmitting glass according to the present invention may contain, in addition to the above components, the following components.

$La_2O_3$, $Gd_2O_3$, and $Y_2O_3$ are components for increasing the stability of vitrification without decreasing infrared transmission characteristics. The content of $La_2O_3+Gd_2O_3+Y_2O_3$ is preferably 0 to 30%, more preferably 0 to 15%, still more preferably 1 to 11%, particularly preferably 2 to 10%, and most preferably 3 to 9%. If the content of these components is too large, this makes vitrification less likely. Note that among these components $La_2O_3$ has the highest effect of increasing the stability of vitrification. Therefore, positive incorporation of $La_2O_3$ facilitates vitrification. The content of each component of $La_2O_3$, $Gd_2O_3$, and $Y_2O_3$ is preferably 0 to 30%, more preferably 0.5 to 15%, still more preferably 1 to 11%, particularly preferably 2 to 10%, and most preferably 3 to 9%.

Since $SiO_2$, $B_2O_3$, $P_2O_5$, $GeO_2$, and $Al_2O_3$ decrease light transmissivity in infrared range, the content of each of them is preferably less than 1% and, more preferably, the infrared-transmitting glass is substantially free of these components.

The following elements Ce, Pr, Nd, Sm, Eu, Tb, Ho, Er, Tm, Dy, Cr, Mn, Fe, Co, Cu, V, Mo, and Bi significantly absorb light in a visible range of wavelengths of about 400 to about 800 nm. Therefore, when the infrared-transmitting glass is substantially free of these components, a glass having high light transmissivity over a wide visible range can be easily obtained.

Because Pb, Cs, and Cd are environmentally harmful substances, the infrared-transmitting glass is preferably substantially free of these substances.

Li, Na, and K are components for increasing the transmittance in visible range. However, they are also components that break the bonds of the glass network. Therefore, if the content of them is too large, the chemical durability is liable to decrease. Hence, Li, Na, and K are, in total, preferably 0 to 20%, more preferably 0 to 10%, and still more preferably 0 to 5%.

The infrared-transmitting glass according to the present invention has excellent light transmissivity in mid-infrared range (with wavelengths of about 4 to about 8 μm). Examples of the index for evaluating the light transmissivity in mid-infrared range include the 50% transmission wavelength between 5 μm and 7 μm and the infrared absorption edge wavelength. It can be said that the greater the 50% transmission wavelength between 5 μm and 7 μm and the infrared absorption edge wavelength, the better the light transmissivity in mid-infrared range. The 50% transmission wavelength between 5 μm and 7 μm (at a thickness of 1 mm) of the infrared-transmitting glass according to the present invention is preferably 5.5 μm or more and more preferably 5.7 μm or more. The infrared absorption edge wavelength (at a thickness of 1 mm) of the infrared-transmitting glass according to the present invention is preferably 7 μm or more and more preferably 7.5 μm or more.

The visible absorption edge wavelength (at a thickness of 1 mm) of the infrared-transmitting glass according to the present invention is preferably 380 nm or less and more preferably 360 nm or less. It can be said that the smaller the visible absorption edge wavelength, the better the light transmittance m visible range. When the visible absorption edge wavelength is within the above range, the infrared-transmitting glass is suitable for applications requiring light transmissivity in visible range from design or other viewpoints.

The refractive index nd of the infrared-transmitting glass according to the present, invention is preferably 1.95 or more and more preferably 2.00 or more. Furthermore, the refractive index n1550 thereof is preferably 1.90 or more and more preferably 1.95 or more. When the refractive index is high, light rays can be refracted with a short optical path length. Therefore, in the case of using an optical glass according to the present invention, for example, as a lens, the lens can be thinner with increasing refractive index, which is advantageous in reducing the size of an optical device.

The Abbe's number of the infrared-transmitting glass according to the present invention is preferably 18 or more and more preferably 20 or more. Greater Abbe's numbers are preferred because the wavelength dispersion of the refractive index becomes smaller. However, because there is a trade-off between the Abbe's number and the refractive index, the upper limit of the Abbe's number is preferably not more than 23 and more preferably not more than 22 from the viewpoint of maintaining high refractive index characteristics.

The glass transition point of the infrared-transmitting glass according to the present invention is preferably 400° C. or less and more preferably 350° C. or less. Lower glass transition points make the press working easier, which is advantageous in molding the glass into an optical element, such as a lens.

The liquidus temperature of the infrared-transmitting glass according to the present invention is preferably 600° C. or less and more preferably 550° C. or less. The liquidus temperature is an index of ease of devitrification. The lower the liquidus temperature, the better the resistance to devitrification.

The infrared-transmitting glass according to the present invention can be used not only as a cover member for protecting a sensor section of an infrared sensor but also, for example, as an optical element, such as a lens, for focusing infrared light on the sensor section.

EXAMPLES

Hereinafter, the present invention will be described in detail with reference to examples, but is not limited to the examples.

Table 1 shows examples (samples Nos. 1 to 7) of the present invention and comparative examples (samples Nos. 8 to 10).

TABLE 1

| | | Ex. | | | | |
|---|---|---|---|---|---|---|
| | | 1 | 2 | 3 | 4 | 5 |
| Glass Composition (% by mole) | $TeO_2$ | 75 | 75 | 75 | 70 | 65 |
| | ZnO | 20 | 20 | 20 | 20 | 20 |
| | BaO | 5 | | | 10 | 15 |
| | CaO | | 5 | | | |
| | SrO | | | 5 | | |
| | $Eu_2O_3$ | | | | | |
| 50% Infrared Transmission Wavelength (μm) | | 6.05 | 6.03 | 6.06 | 6.07 | 6.11 |
| Infrared Absorption Edge Wavelength (μm) | | 7.72 | 7.73 | 7.75 | 7.92 | 8.22 |
| Visible Absorption Edge Wavelength (nm) | | 350 | 349 | 350 | 347 | 342 |
| Color Tone | | pale yellow | pale yellow | pale yellow | pale yellow | pale yellow |
| Refractive Index nd | | 2.07692 | 2.07667 | 2.07711 | 2.04098 | 2.00503 |
| Refractive Index nF | | 2.12054 | 2.12083 | 2.12177 | 2.07761 | 2.03909 |
| Refractive Index nC | | 2.06212 | 2.06291 | 2.06327 | 2.02473 | 1.99155 |
| Refractive Index n1550 | | 2.01517 | 2.01509 | 2.01658 | 1.97908 | 1.94799 |
| Abbe's Number νd | | 18.4 | 18.6 | 18.4 | 19.7 | 21.1 |
| Glass Transition Point (° C.) | | 318 | 317 | 318 | 326 | 339 |
| Liquidus Temperature (° C.) | | 502 | 522 | 517 | 504 | 442 |

| | | Example | | Comp. Ex. | | |
|---|---|---|---|---|---|---|
| | | 6 | 7 | 8 | 9 | 10 |
| Glass Composition (% by mole) | $TeO_2$ | 66 | 74.8 | 80 | 49 | 45 |
| | ZnO | 20 | 20 | 20 | 21 | 45 |
| | BaO | 13 | 5 | | 30 | 10 |
| | CaO | | | | | |
| | SrO | 1 | | | | |
| | $Eu_2O_3$ | | 0.2 | | | |
| 50% Infrared Transmission Wavelength (μm) | | 6.11 | 6.03 | 6.03 | 6.13 | Not Verified |
| Infrared Absorption Edge Wavelength (μm) | | 8.17 | 7.72 | 7.6 | 8.23 | |
| Visable Absorption Edge Wavelength (nm) | | 343 | 350 | 352 | 332 | |
| Color Tone | | pale yellow | red | pale yellow | pale yellow | |
| Refractive Index nd | | 2.01308 | 2.07720 | 2.11287 | 1.89718 | |
| Refractive Index nF | | 2.04774 | 2.12181 | 2.15827 | 1.92582 | |
| Refractive Index nC | | 1.99931 | 2.06337 | 2.09611 | 1.86648 | |
| Refractive Index n1550 | | 1.95498 | 2.01572 | 2.04726 | 1.84572 | |
| Abbe's Number νd | | 20.9 | 18.4 | 17.9 | 22.8 | |
| Glass Transition Point (° C.) | | 337 | 317 | 308 | 370 | |
| Liquidus Temperature (° C.) | | 475 | 504 | 623 | 640 | |

Figure 2:
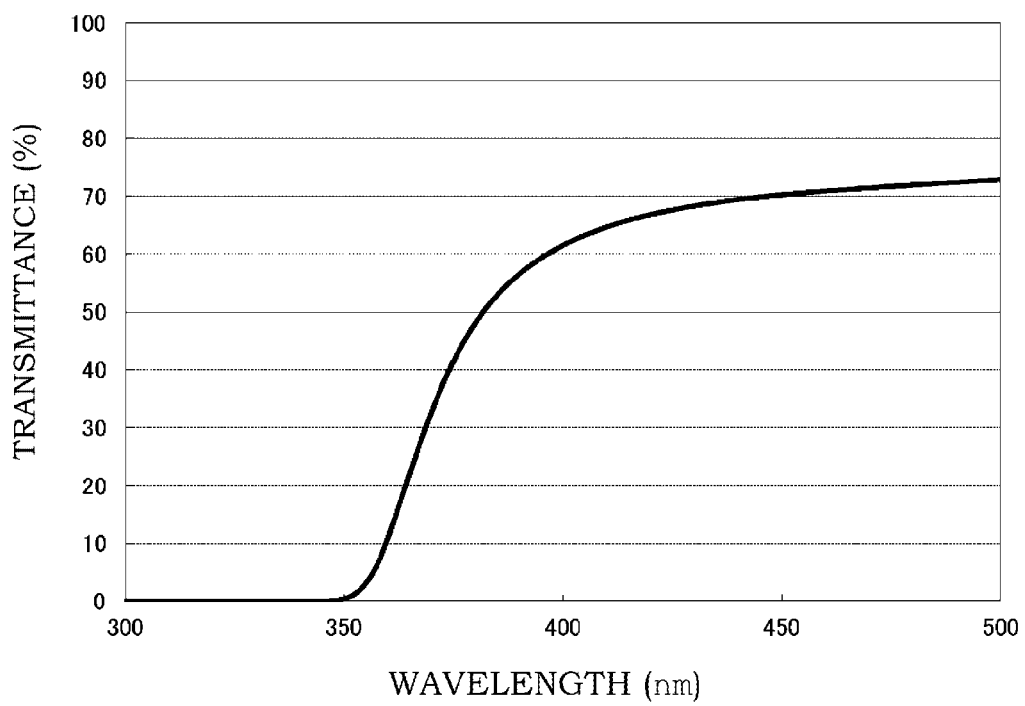
FIG. 2 is a graph representing a visible range light transmittance curve of the glass of sample No. 1 which is the example.

Each sample was prepared in the following manner. First, raw materials prepared to have a glass composition indicated in the table were mixed at 800 to 1000° C. with stirring for 30 minutes to 2 hours and the resultant molten glass was allowed to flow on a carbon plate to form it in a sheet. The resultant samples were measured in terms of light transmittances in visible and infrared ranges and liquidus temperature. Furthermore, the color tones of the samples were visually checked. The results are shown in Table 1. FIG. 1 shows a graph representing a light transmittance curve of sample No. 1 glass in mid-infrared range and FIG. 2 shows a graph representing a light transmittance curve thereof in visible range.

For the measurement of light transmittance, each sample having a thickness of 1 mm and subjected at both sides to mirror polishing was used. The measurement was performed by using 300 to 800 nm as a visible range and 2 to 10 μm as an infrared range. In terms of "Visible Absorption Edge Wavelength", a wavelength at which the light transmittance was 0.5% in the vicinity of 300 to 400 nm wavelength was read. In terms of "50% Infrared Transmission Wavelength", a wavelength at which the light transmittance was 50% within a wavelength range of 5 to 7 μm was read. In terms of "Infrared Absorption Edge Wavelength", a wavelength at which the light transmittance was 0.5% in the vicinity of 7 to 9 μm wavelength was read.

The refractive indices are values measured by the V-block method. Specifically, each sample was polished to have a right angle and its refractive index was evaluated, with KPR-2000 (manufactured by Shimadzu Corporation), by values measured in terms of the d-line (587.6 nm) of a helium lamp, the F-line (486.1 nm) and the C-line (656.3 nm) of a hydrogen lamp, and the 1550 nm-line of a semiconductor laser.

The Abbe's number was calculated using the values of the above refractive indices at the d-line, the F-line, and the C-line in accordance with the formula: Abbe's number $(vd)=\{(nd-1)/(nF-nC)\}$.

The glass transition point was determined from a thermal expansion coefficient curve obtained by measurement with a dilatometer.

The liquidus temperature was measured in the following manner. Each sample was ground, put into a platinum boat, and held at a melting temperature for 15 minutes. Thereafter, the platinum boat was held in a temperature-gradient furnace for 16 hours and a temperature at which crystal precipitation was confirmed was measured as the liquidus temperature.

As shown in Table 1, samples Nos. 1 to 7, which are inventive examples, had 50% infrared transmission wavelengths of 6.03 to 6.11 μm and infrared absorption edge wavelengths of 7.72 to 8.22 μm, and, therefore, had good light transmissivity in a mid-infrared range of wavelengths of about 4 to about 8 μm. Furthermore, sample Nos. 1 to 7 had visible absorption edge wavelengths of 342 to 350 nm and, therefore, exhibited good light transmissivity in visible range. Particularly, samples Nos. 1 to 6 had excellent light transmissivity in the entire visible range and their color tones were pale yellow, which is nearly colorless and transparent. In addition, samples Nos. 1 to 7 had refractive indices nd as high as 2.00503 to 2.07720, refractive indices n1550 as high as 1.94799 to 2.01658, and Abbe's numbers as high as 18.4 to 21.1. Furthermore, samples Nos. 1 to 7 had glass transition points as low as 317 to 339° C. and, therefore, excellent press moldability. Moreover, samples Nos. 1 to 7 had liquidus temperatures as low as 442 to 522° C. and, therefore, had relatively stable vitrification.

In contrast, samples Nos. 8 and 9, which are comparative examples, had liquidus temperatures as high as 623 to 640° C. and, therefore, poor resistance to devitrification. Furthermore, sample No. 9 had a refractive index nd as low as 1.89718, a refractive index n1550 as low as 1.84572, and a glass transition point as high as 370° C. Sample No. 10 could not be vitrified.

INDUSTRIAL APPLICABILITY

The infrared-transmitting glass according to the present invention is suitable as a cover member of an infrared sensor, such as a $CO_2$ sensor or a human sensor, or an optical element such as a lens.

The invention claimed is:

1. A cover member for an infrared sensor, the cover member comprising:
    an infrared-transmitting glass containing, in % by mole, 50% or more $TeO_2$, 0 to 45% (exclusive of 0%) ZnO, and 1 to 50% (exclusive of 50%) SrO; wherein
    a content of each of $SiO_2$, $B_2O_3$, $P_2O_5$, $GeO_2$, and $Al_2O_3$ is less than 1%.

2. The cover member for an infrared sensor according to claim 1, wherein the infrared-transmitting glass is substantially free of Ce, Pr, Nd, Sm, Eu, Tb, Ho, Er, Tm, Dy, Cr, Mn, Fe, Co, Cu, V, Mo, and Bi.

3. The cover member for an infrared sensor according to claim 1, wherein the infrared-transmitting glass is substantially free of Pb, Cs, and Cd.

4. An infrared sensor comprising the cover member for an infrared sensor according to claim 1.

* * * * *